United States Patent
Jin et al.

(10) Patent No.: US 10,458,228 B2
(45) Date of Patent: Oct. 29, 2019

(54) LOW FREQUENCY DISTRIBUTED ACOUSTIC SENSING

(71) Applicant: CONOCOPHILLIPS COMPANY, Houston, TX (US)

(72) Inventors: Ge Jin, Houston, TX (US); Charles C. Mosher, Houston, TX (US); Frank P. Filice, Houston, TX (US); Kyle R. Krueger, Houston, TX (US); Baishali Roy, Houston, TX (US); Ali Tura, Golden, CO (US); Dana M. Jurick, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 72 days.

(21) Appl. No.: 15/453,434

(22) Filed: Mar. 8, 2017

(65) Prior Publication Data

US 2017/0260842 A1 Sep. 14, 2017

Related U.S. Application Data (60) Provisional application No. 62/305,758, filed on Mar. 9, 2016, provisional application No. 62/305,777, filed on Mar. 9, 2016.

(51) Int. Cl.
*E21B 47/12* (2012.01)
*G01V 1/22* (2006.01)
(Continued)

(52) U.S. Cl.
CPC ...... *E21B 47/101* (2013.01); *E21B 47/02208* (2013.01); *E21B 47/02216* (2013.01);
(Continued)

(58) Field of Classification Search
CPC .. E21B 47/101; E21B 43/26; E21B 47/02208; E21B 47/123; E21B 41/0092;
(Continued)

(56) References Cited

U.S. PATENT DOCUMENTS 3,981,187 A 9/1976 Howell
4,676,664 A 6/1987 Anderson et al.
(Continued)

FOREIGN PATENT DOCUMENTS

GB 2492802 1/2013
WO 2001048353 7/2001
(Continued)

OTHER PUBLICATIONS

Boman, K.,—"DAS Technology Expands Fiber Optic Applications for Oil, Gas Industry", 2015, Rigzone, Energy News Article, May 4, 2015 issue, http://www.rigzone.com/news/oil_gas/a/138405/DAS_Technology_Expands_Fiber_Optic_Applications_for_Oil_Gas_Industry; 4 pgs.
(Continued)

*Primary Examiner* — Michael R Wills, III
(74) *Attorney, Agent, or Firm* — Boulware & Valoir (57) ABSTRACT

The invention relates to DAS observation has been proven to be useful for monitoring hydraulic fracturing operations. While published literature has shown focus on the high-frequency components (>1 Hz) of the data, this invention discloses that much of the usable information may reside in the very low frequency band (0-50 milliHz). Due to the large volume of a DAS dataset, an efficient workflow has been developed to process the data by utilizing the parallel computing and the data storage. The processing approach enhances the signal while decreases the data size by 10000 times, thereby enabling easier consumption by other multi-disciplinary groups for further analysis and interpretation.
(Continued)

The polarity changes as seen from the high signal to noise ratio (SNR) low frequency DAS images are currently being utilized for interpretation of completions efficiency monitoring in hydraulically stimulated wells.

18 Claims, 3 Drawing Sheets

(51) Int. Cl.
| | | |
|---|---|---|
| *E21B 47/022* | (2012.01) | |
| *G01H 9/00* | (2006.01) | |
| *E21B 47/10* | (2012.01) | |
| *G01K 11/32* | (2006.01) | |
| *G01V 1/40* | (2006.01) | |

(52) U.S. Cl.
CPC .......... *E21B 47/123* (2013.01); *G01H 9/004* (2013.01); *G01K 11/32* (2013.01); *G01V 1/226* (2013.01); *G01V 1/40* (2013.01)

(58) Field of Classification Search
CPC .... E21B 47/02216; E21B 44/00; E21B 47/00; E21B 43/2406; E21B 43/20; E21B 43/166; E21B 43/16; E21B 49/00; E21B 33/12; E21B 47/1015; E21B 47/065; G01H 9/004; G01K 11/32; G01F 1/666; G01B 11/161; G01V 1/226; G01V 1/40
See application file for complete search history.

(56) References Cited

U.S. PATENT DOCUMENTS

| | | | |
|---|---|---|---|
| 6,026,913 A | 2/2000 | Mandal et al. | |
| 6,176,323 B1 | 1/2001 | Weirich et al. | |
| 6,268,911 B1 | 7/2001 | Tubel et al. | |
| 6,778,720 B1 | 8/2004 | Cekorich et al. | |
| 7,668,411 B2 | 2/2010 | Davies et al. | |
| 8,505,625 B2 | 8/2013 | Ravi et al. | |
| 8,630,816 B2 | 1/2014 | Park et al. | |
| 8,646,968 B2 | 2/2014 | MacDougall et al. | |
| 8,930,143 B2 | 1/2015 | Sierra et al. | |
| 8,950,482 B2 | 2/2015 | Hill et al. | |
| 9,116,119 B2 | 8/2015 | Le Floch | |
| 9,273,548 B2 | 3/2016 | LeBlanc et al. | |
| 9,416,644 B2 | 8/2016 | McEwen-King et al. | |
| 10,095,828 B2 | 10/2018 | Swan et al. | |
| 2002/0180728 A1 | 12/2002 | Neff et al. | |
| 2003/0205375 A1* | 11/2003 | Wright et al. ......... | E21B 43/26 166/250.1 |
| 2006/0272809 A1 | 12/2006 | Tubel et al. | |
| 2008/0277568 A1 | 11/2008 | Crickmore et al. | |
| 2009/0114386 A1 | 5/2009 | Hartog et al. | |
| 2009/0194333 A1 | 8/2009 | MacDonald | |
| 2009/0326826 A1* | 12/2009 | Hull .................... | E21B 47/1005 702/8 |
| 2010/0200743 A1 | 8/2010 | Forster et al. | |
| 2010/0284250 A1 | 11/2010 | Cornish et al. | |
| 2011/0019178 A1* | 1/2011 | Vlatas ................... | G01B 11/18 356/32 |
| 2012/0017687 A1 | 1/2012 | Davis et al. | |
| 2012/0057432 A1 | 3/2012 | Hill et al. | |
| 2012/0067118 A1 | 3/2012 | Hartog et al. | |
| 2012/0147924 A1 | 6/2012 | Hall | |
| 2013/0023353 A1 | 1/2013 | Wright | |
| 2013/0211726 A1 | 8/2013 | Mestayer et al. | |
| 2013/0233537 A1 | 9/2013 | McEwen-King et al. | |
| 2013/0298635 A1 | 11/2013 | Godfrey | |
| 2013/0298665 A1 | 11/2013 | Minchau | |
| 2014/0036628 A1* | 2/2014 | Hill; David ............ | G01V 1/42 367/35 |
| 2014/0110124 A1 | 4/2014 | Goldner et al. | |
| 2014/0126325 A1 | 5/2014 | Farhadiroushan et al. | |
| 2014/0163889 A1 | 6/2014 | Finfer et al. | |
| 2014/0180592 A1 | 6/2014 | Ravi et al. | |
| 2014/0202240 A1 | 7/2014 | Skinner et al. | |
| 2014/0216151 A1 | 8/2014 | Godfrey et al. | |
| 2014/0246191 A1 | 9/2014 | Zolezzi-Garreton | |
| 2014/0260588 A1 | 9/2014 | Jaaskelainen et al. | |
| 2014/0290936 A1 | 10/2014 | Wills et al. | |
| 2014/0358444 A1 | 12/2014 | Friehauf et al. | |
| 2014/0365130 A1 | 12/2014 | Woods | |
| 2015/0014521 A1* | 1/2015 | Barfoot ................. | E21B 47/123 250/261 |
| 2015/0135819 A1 | 5/2015 | Petrella et al. | |
| 2015/0146759 A1 | 5/2015 | Johnston | |
| 2015/0159478 A1 | 6/2015 | Georgi et al. | |
| 2015/0331971 A1 | 11/2015 | Scollard et al. | |
| 2016/0003032 A1 | 1/2016 | Grubb et al. | |
| 2016/0138389 A1 | 5/2016 | Stokely | |
| 2016/0146962 A1 | 5/2016 | Hayward | |
| 2016/0265345 A1 | 9/2016 | In't Panhuis et al. | |
| 2016/0266276 A1 | 9/2016 | Stokely et al. | |
| 2017/0045410 A1 | 2/2017 | Crickmore et al. | |
| 2017/0260839 A1 | 9/2017 | Beardmore et al. | |
| 2017/0260842 A1 | 9/2017 | Jin et al. | |
| 2017/0260846 A1 | 9/2017 | Jin et al. | |
| 2017/0260849 A1 | 9/2017 | Jin et al. | |
| 2017/0260854 A1 | 9/2017 | Jin et al. | |
| 2017/0342814 A1 | 11/2017 | Krueger et al. | |
| 2018/0217285 A1 | 8/2018 | Walters et al. | |
| 2018/0230049 A1 | 8/2018 | Wysocki et al. | |

FOREIGN PATENT DOCUMENTS

| | | |
|---|---|---|
| WO | 2013092906 | 6/2013 |
| WO | 2014201316 | 12/2014 |
| WO | 2015065869 | 5/2015 |
| WO | 2015076976 | 5/2015 |
| WO | 2015094180 | 6/2015 |
| WO | 2015107332 | 7/2015 |
| WO | 2015170113 | 11/2015 |
| WO | 2015187140 | 12/2015 |
| WO | 2015187149 | 12/2015 |
| WO | 2016007161 | 1/2016 |
| WO | 2016069322 | 5/2016 |
| WO | 2017039605 | 3/2017 |
| WO | 2017156339 | 9/2017 |

OTHER PUBLICATIONS

Webster, P., et al—"Developments in Diagnostic Tools for Hydraulic Fracture Geometry Analysis", 2013, Unconventional Resources Technology Conferene (URTeC), Denver, Colorado, Aug. 12-14, 2013, SPE 168933/URTec 1619968, pp. 1-7; 7 pgs.
Optasense, "Pipeline Integrity Management: Leak Detection", 2013 brochure, www.optasense.com; 5 pgs.
Awada, A., et al. "Is that interference? A work flow for identifying and analyzing communication through hydraulic fractures in a multiwell pad," SPE Journal, vol. 21, No. 5, p. 13 (Oct. 2016).
Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).
Booone, K., et al., "Monitoring Hydraulic Fracturing Operations Using Fiber-Optic Distributed Acoustic Sensing," Unconventional Resources Technology Conference, p. 8 (2015).
European Search Report for European Application No. EP 17764137.0 dated Mar. 6, 2019.
European Search Report for European Application No. EP 17764143.8 dated Mar. 4, 2019.
European Search Report for European Application No. EP 17764150.3 dated Mar. 4, 2019.
European Search Report for European Application No. EP 17764151.1 dated Mar. 4, 2019.
European Search Report for European Application No. EP17764146.1 dated Mar. 14, 2019.
Grayson, S., et al., "Monitoring acid stimulation treatments in naturally fractured reservoirs with slickline distributed temperature sensing," Society of Petroleum Engineers, p. 17, (Jan. 2015).

(56) References Cited

OTHER PUBLICATIONS

International Search Report with Written Opinion for International Application No. PCT/US2017/021659 dated Jun. 1, 2017, p. 7.
International Search Report with written opinion dated Jun. 1, 2017 for International Application No. PCT/US2017/021667, p. 8.
International Search Report with Written Opinion for International Application No. PCT/US2017/021674 dated May 25, 2017, p. 10.
International Search Report with Written Opinion for International Application No. PCT/US2017/021678 dated Jun. 1, 2017, p. 7.
International Search Report with Written Opinion for International Application No. PCT/US2017/021679 dated May 25, 2017, p. 7.
International Search Report with Written Opinion for International Application No. PCT/US2017/021681 dated May 22, 2017, p. 10.
International Search Report with Written Opinion for International Application No. PCT/US2017/21670 dated May 25, 2017, p. 6.
Jin, G., and Roy, B., "Hydraulic-fracture geometry characterization using low-frequency DAS signal," The Leading Edge, vol. 36, No. 12, pp. 962-1044 (Dec. 2017).
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve completion and reservoir management," Society of Petroleum Engineers, p. 7 (Jan. 2007).
Lord, D.L., "Study of Performation Friction Pressure Employing a Loarge-Scale Fracturing Flow Simulator," SPE Annual technical Conference and Exhibition, p. 10 (Sep. 25, 1994).
McKinley, R.M., et al., "Specialized Applications of Noise Logging," Journal of Petroleum Technology, vol. 31, Issue 11, pp. 1387-1395 (Nov. 1979).
McKinley, R.M., et al., "The Structure and Interpretation of Noise From Flow Behind Cemented Casing," Journal of Petroleum Technology, vol. 25, No. 3, pp. 329-338 (Mar. 1973).
Molenaar, M., et al, "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, p. 13 (2012).
Ouyang, L.-B., et al. "Flow profiling via distributed temperature sensor (DTS) system-expectation and reality," Society of Petroleum Engineers, p. 14 (2004).
Paleja, R, et al., "Velocity Tracking for Flow Monitoring and Production Profiling Using Distributed Acoustic Sensing," Society of Petroleum Engineers, p. 16 (Sep. 28-30, 2015).
Portis, D. H., et al., "Searching for the optimal well spacing in the eagle ford shale: A practical tool-kit," Unconventional Resources Technology Conference, p. 8 (Aug. 12-14, 2013).
Sellwood S.M., et al., "An in-well heat-tracer-test method for evaluating borehole flow conditions," Hydrogeology Journal, Springer, vol. 23, No. 8, pp. 1817-1830 (Aug. 29, 2015).
Webster, P., et al. "Micro-Seismic detection using distributed acoustic sensing," society of Exploration Geophysicists, p. 5 (Aug. 19, 2013).
Wheaton, B., et al. "A case study of completion effectiveness in the eagle ford shale using DAS/DTS observations and hydraulic fracture modeling," Society of Petroleum Engineers, p. 11 (2016).
Wu, K., et al. "Mechanism analysis of well interference in unconventional reservoirs: Insights from fracture-geometry simulation between two horizontal wells," Society of Petroleum Engineers, vol. 33, No. 1, p. 9 (Feb. 2018).

* cited by examiner

LOW FREQUENCY DISTRIBUTED ACOUSTIC SENSING

CROSS-REFERENCE TO RELATED APPLICATIONS

This application is a non-provisional application which claims benefit under 35 USC § 119(e) to U.S. Provisional Application Ser. No. 62/305,758 filed Mar. 9, 2016, entitled "LOW FREQUENCY DISTRIBUTED ACOUSTIC SENSING," and Ser. No. 62/305,777 filed Mar. 9, 2016, entitled "PRODUCTION LOGS FROM DISTRIBUTED ACOUSTIC SENSORS," which are incorporated herein in their entirety.

STATEMENT REGARDING FEDERALLY SPONSORED RESEARCH

None.

FIELD OF THE INVENTION

The present invention relates generally to the use of distributed fiber optic sensing including Distributed Acoustic Sensing (DAS) and Distributed Thermal Sensing (DTS) in subterranean wellbores for hydrocarbon production. In particular this application is directed to detailed completion operations and production monitoring utilizing low frequency monitoring of fiber optic signals including DAS and DTS signals.

BACKGROUND OF THE INVENTION

Fiber-optic cables can be installed in vertical and horizontal wells, which can be treatment wells, injector wells or observation wells. Within the cable there are often both single mode fibers for DAS and multi-mode fibers for DTS. Multiple fibers within one cable can offer redundancy and the ability to interrogate with different instrumentation simultaneously.

DAS is the measure of Rayleigh scatter distributed along the fiber optic cable. A coherent laser pulse is sent along the optic fiber, and scattering sites within the fiber cause the fiber to act as a distributed interferometer with a pre-set gauge length. The intensity and phase of the reflected light is measured as a function of time after transmission of the laser pulse. When the pulse has had time to travel the full length of the fiber and back, the next laser pulse can be sent along the fiber. Changes in the reflected intensity and phase of successive pulses from the same region of fiber are caused by changes in the optical path length of that section of fiber. This type of system is very sensitive to both strain and temperature variations of the fiber and measurements can be made almost simultaneously at all sections of the fiber.

Raw DAS data are usually in the form of optical phase, with a range from −pi to +pi. The optical phase is defined by the interference pattern of the back-scattered laser energy at two locations separated by a certain length (gauge length) along the fiber. The phase varies linearly with a small length change between these two locations, which can be interpreted as axial strain change of the fiber in between. Depending on the vender, the measured optical phase is sometimes differentiated in time before it is stored. In this case, the DAS data can be considered as linear scaled fiber strain rates.

DAS has been used to monitor hydraulic fracturing operation. The applications include injection fluid allocation (e.g. Broone et al. 2015), hydraulic fracture detection (e.g. Webster et al. 2013), and production allocation (e.g. Paleja et al. 2015). However, these applications focus on the DAS signals that are in high frequency bands (>1 Hz), and some applications only use the "intensity" of the signal (waterfall plot), which is obtained through a RMS averaging operation.

DAS has been used extensively to measure strain in hydrocarbon wells. Hill, et al., (U.S. Pat. No. 8,950,482) monitor hydraulic fracturing during oil/gas well formation. Tubel, et al., (US20060272809) control production operations using fiber optic devices. Hartog, et al., (US20090114386) use an optical fiber as a distributed interferometer that may be used to monitor the conduit, wellbore or reservoir. Minchau (US20130298665) provides an in-situ permanent method for measuring formation strain in a volume around a treatment well. McEwen-King (US20130233537) acoustic data from distributed acoustic sensing is processed together with flow properties data to provide an indication of at least one fracture characteristic. This is in no way an all-encompassing review of the technology. A recent review was published by Webster (2013) and the field continues to advance rapidly.

Current visualization and interpretation of DAS data as-provided by vendors and as seen from publications (e.g. Webster et al., 2013) are based on high-frequency (>1 Hz) intensity analysis that contains useful but limited information. The high frequency information has been used by others for proppant allocation estimation, stimulation operation monitoring, production logging, and other useful observations. Unfortunately, the use of high frequency DAS signals for analysis, had led to the removal of lower frequency and ultra-low frequency signals from the data by many vendors.

BRIEF SUMMARY OF THE DISCLOSURE

Figure 3:
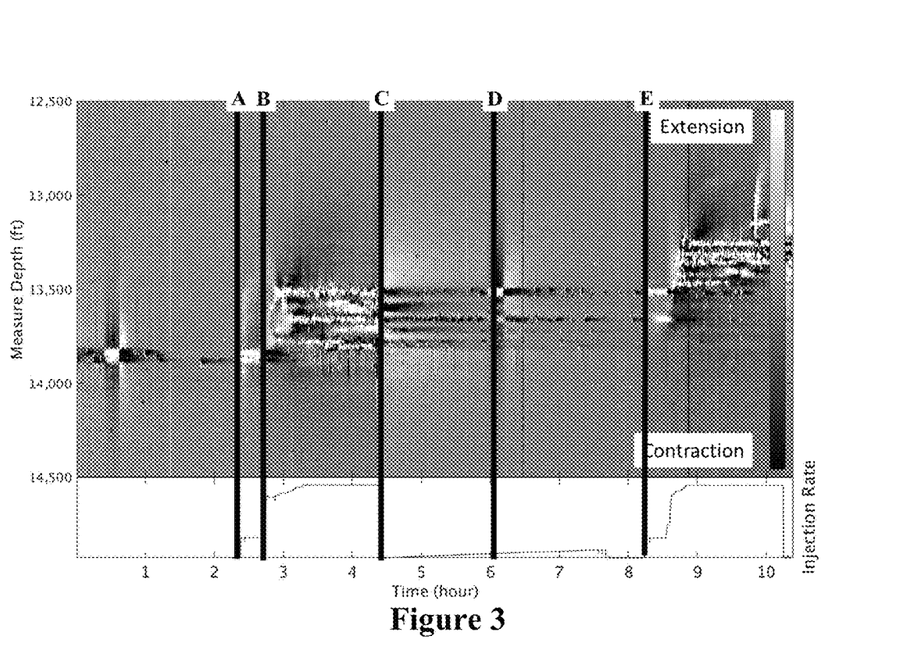
FIG. 3 is a DAS Low-frequency Cross-well Signal.
Figure 4:
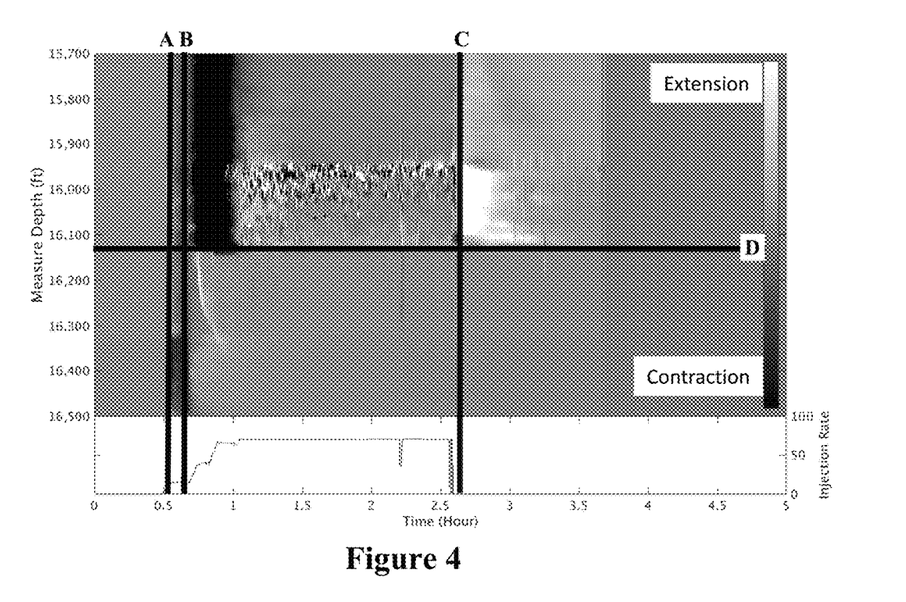
FIG. 4 is DAS Low-frequency In-well Signal.

The DAS signal in the ultra-low frequency band from 0-50 milliHz (mHz) has the potential to explain the strain-field response due to the completions (in-well) and fracturing process (cross-well) at monitor wells in greater details (FIGS. 3 and 4). Preliminary analysis indicates that DAS low frequency signals may help us understand some key characteristics of the hydraulic fracturing process: stage isolation, injection allocation, cluster efficiency and spacing, fracture geometry and network, stimulated reservoir volume, and the like.

In one embodiment, a process for monitoring hydrocarbon production is described with the following steps:
a) installing fiber optic cables along a wellbore in a hydrocarbon formation;
b) attaching an interrogator on the fiber optic cable;
c) interrogating the fiber optic cable with an interrogation signal;
d) obtaining one or more datasets from the interrogator;
e) converting the datasets from the interrogator into a continuous record;
f) transforming the continuous record with a low-pass filter with corer frequency at 1-50 milliHz while down sampling the data into a transformed well signal;
g) interpreting the transformed well signal; and
h) improving hydrocarbon production from said hydrocarbon formation.

In another embodiment, a method of monitoring hydrocarbon production comprises, installing fiber optic cables along the wellbore in a hydrocarbon formation; interrogating the fiber optic cable with an interrogator; obtaining one or more datasets from the interrogator; converting the datasets from the interrogator into a continuous record; transforming the continuous record with a low-pass filter from 0-50 milliHz while down sampling the data into a transformed well signal; interpreting the transformed well signal; and monitoring hydrocarbon production from said hydrocarbon formation.

In an additional embodiment, the effectiveness of a hydrocarbon well treatment is determined by:

a) installing fiber optic cables along a wellbore in a hydrocarbon formation;
b) installing one or more interrogators on the fiber optic cables;
c) interrogating the fiber optic cable with an interrogation signal before, during, and/or after a well treatment;
d) obtaining one or more datasets from the interrogator;
e) converting the datasets from the interrogator into a continuous record;
f) transforming the continuous record with a low-pass filter with corner frequency at 1-50 milliHz while down sampling the data into a transformed well signal;
g) interpreting the transformed well signal; and
h) improving hydrocarbon production from said hydrocarbon formation.

The transformed well signal may be an in-well signal from the wellbore of interest consisting of a production well or an injection well. Alternatively, the transformed well signal may be a cross-well signal from a wellbore that is adjacent to the well of interest consisting of a production well, and injection well, a monitoring well, a vertical well, or other well within the formation.

The hydrocarbon formation may be monitored via fiber optic signals while it is undergoing hydraulic fracturing, start-up, shut-in, enhanced oil recovery, waterflood, steamflood, water alternating gas treatment, or other well treatment.

The continuous record may be transformed with an ultra-low frequency filter by removing signals above 1 mHz, 5 mHz, 10 mHz, 15 mHz, 20 mHz, 30 mHz, 45 mHz, or 50 mHz. Additionally, the continuous record may be down-sampled to 1, 3, 5, 10, 15, 20, 25, 50, 75, or 100 second intervals.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 5A:
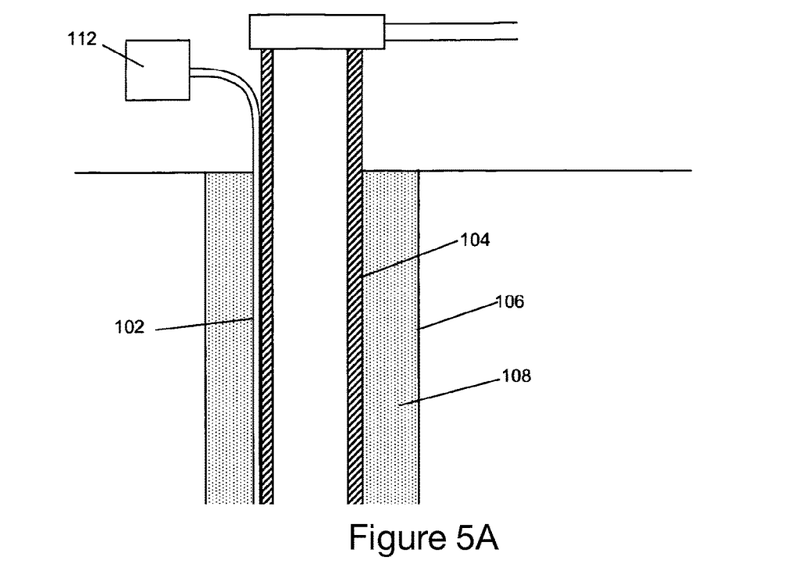
FIG. 5A shows an apparatus for monitoring a well using DAS.
Figure 5B:
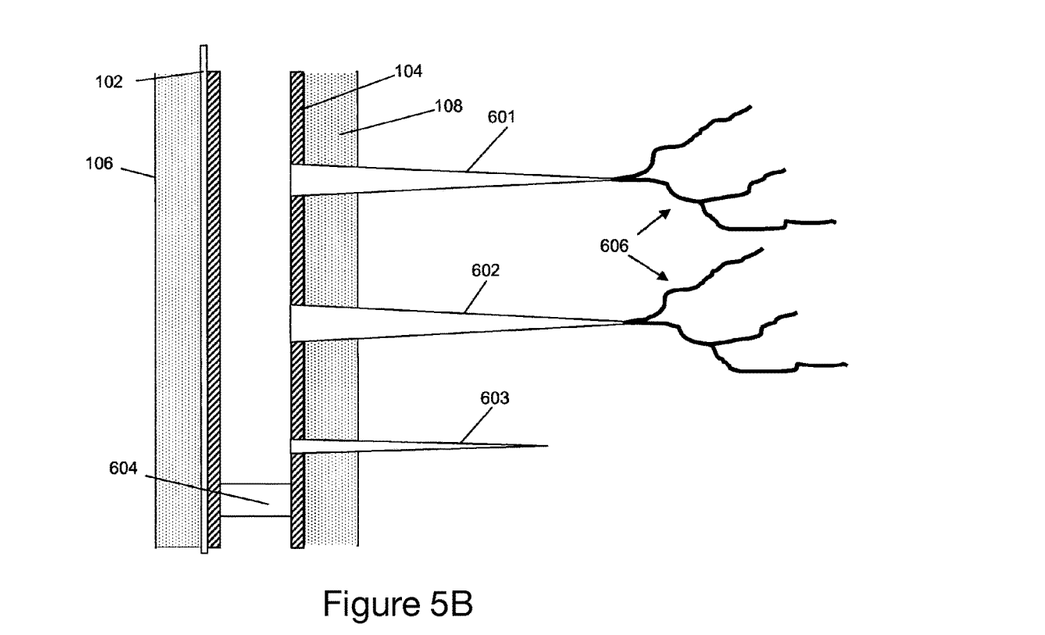
FIG. 5B illustrates a stage in a hydraulic fracturing process.

FIG. 5A shows a top portion of a well, and FIG. 5B shows a second portion deep inside the well. FIG. 5A shows a fiber optic cable 102 included along the path of the well. The well is formed at least in part by a metallic production casing 104 inserted into a bore hole 106, with the space between the outer wall of the casing 104 and the hole 106 being back filled with cement 108. The fiber 102 protrudes from the well head and is connected to interrogator/processor unit 112. FIG. 5B shows perforations 601, 602, 603 created through casing 104 and cement 108 into the surrounding rock formation by firing charges at different depths in the well. Blanking plug 604 isolates the deeper parts of the well which have been previously fractured. Once the perforations have been made the fluid and proppant are flowed into the well to cause fracturing 606.

Previously, Friehauf and Dean (US-2014-0358444, 2014) identify fractures in a formation having a wellbore including: (a) positioning a sensor within the wellbore, wherein the sensor generates a feedback signal representing at least one of a temperature and pressure measured by the sensor; (b) injecting a fluid into the wellbore and into at least a portion of the formation adjacent the sensor; (c) waiting a predetermined period of time; (d) generating a standstill simulated model representing at least one simulated temperature characteristic and at least one pressure characteristic of the formation during and after fluid injection; (e) shutting-in the wellbore for a pre-determined shut-in period; (f) generating a shut-in simulated model representing at least one simulated temperature characteristic and at least one pressure characteristic of the formation during the shut-in period; (g) generating a data model representing the standstill simulated model and the shut-in simulated model, wherein the data model is derived from the feedback signal; and (h) observing the data model for presence of fractures within the wellbore, wherein fractures are present when the temperature characteristics are lower than the temperature characteristics of other sections of the wellbore.

Additionally, Grubb and Friehauf (US-2016-0003032, 2016) provide a logging tool to determine temperature of produced fluid flowing into or within a wellbore including: a core structure; an arm extendibly and pivotally mounted to the core structure, the arm is extended away from the core structure and is near the inner surface of the wellbore, wherein the arm pivots in one plane relative to the core structure; a data transfer device connected to the core structure for receiving, processing and storing data; and at least one temperature sensors attached to the arm, wherein the temperature sensor is located at a tip of the arm, wherein when the arm is extended away from the core structure the temperature sensor is at or near the inner surface of the wellbore.

Unlike prior methods, this method uses transient temperature and strain changes that occur during the completion operation and production period. The signal can be caused by wellbore fluid movement, fracture propagation in the formation, and/or change of reservoir properties.

Scattered light pulses from nearby segments of the fiber are combined in an interferometer. The phase differences between the pulses is then a measure of their relative separations of their origins. A change in separation as small as one one-hundredth of a wavelength can easily and accurately be measured. This typically amounts to a 10E-7 percentage change in fiber length (strain). Although DAS was originally designed to record fiber strains due to acoustic waves of frequencies up to 10 kHz, its response also extends to very low frequencies (<0.05 Hz). It is these low-end frequency components in the DAS response that are caused by the mechanic strain or the thermal expansion from localized temperature variations that this invention utilizes.

Data Acquisition

The fiber-optic cables are installed out of the casing and cemented in place. Numerous interrogators are available to record optical signals including single laser, dual laser, multiple laser, PINNACLE™ Gen-1 and Phase-1, HALLIBURTON™ FIBERWATCH®, PROXIMION™ FBG-Interrogator, NATIONAL INSTRUMENTS™ PXI, LUNA™, or other interrogator. The raw data may be sampled from 5-20 kHz continuously at more than 6000 locations (frequently referred as "channels") with a variety of spatial separations from centimeters to meters along the fiber dependent upon length and required sensitivity. The gauge length may also be varied dependent upon fiber length and the interrogator used, from 1-100 meters, including 1, 5, 10, 25, 50, 75 and 100 meters. When recording, the measured optical phase is differentiated in time, so the raw DAS data is linearly associated with strain rate along the fiber.

Data Processing

The data are down-sampled to 1 s after the anti-aliasing filter (0-0.5 Hz) is applied. It is then median filtered to remove the spiky noise. Then a low-pass filter with a corner frequency of 0.05 Hz is applied. At this stage, a DC component with an amplitude around 0.1 rad/s can be detected in the signal. The DC value is stable and does not vary significantly with operations, and is probably associated with the interrogator noises. For the cross-well applications, we determine the DC value by taking the median value of the channels that are out of range of interested signal at each time interval, and subtract it from the data. For the in-well measurements during the injection, as the signal strength is much higher and the interested signal covers the whole fiber, this DC value is ignored.

Figure 1:
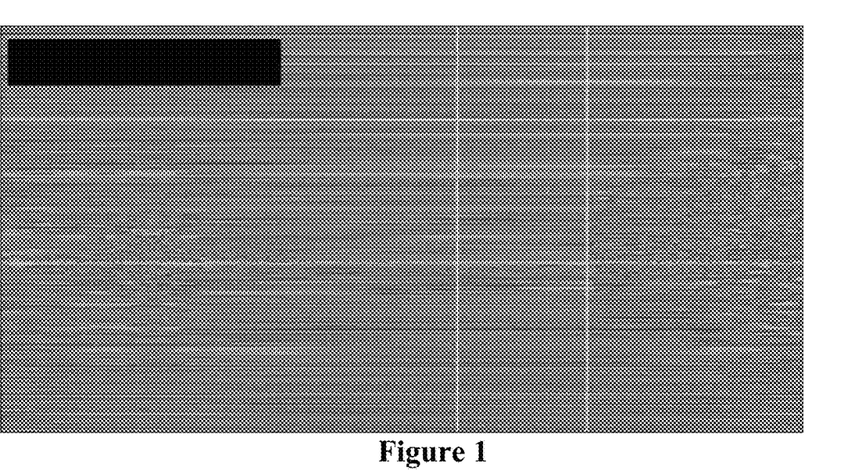
FIG. 1 is a standard industry waterfall DAS plot.
Figure 2:
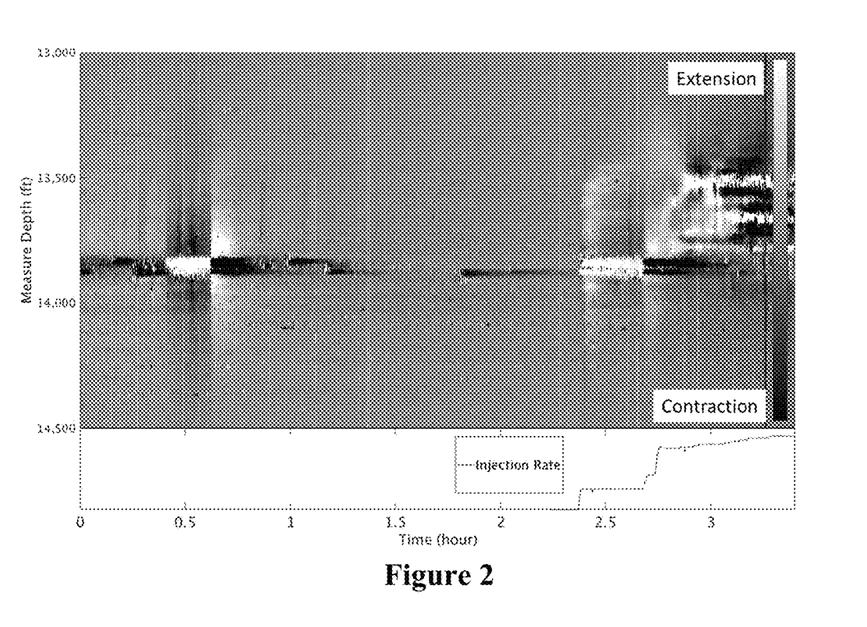
FIG. 2 is a Low Frequency filtered DAS plot.

A comparison between the conventional waterfall plot FIG. 1 and the processed low-frequency signal is shown in FIG. 2. The low-frequency processing not only increases the signal-to-noise ratio of the cross-well signal, but also recovers the polarity of the strain rate, which is critical for later interpretation. The strain change recorded by DAS at this frequency band can be caused by thermal extension/contraction or by mechanic strain change in the formation.

The DAS signal in the low-frequency band (0-0.05 Hz) also carries critical information that is related to the hydraulic fracture development during the stimulation process. This information has the potential to answer key questions to improve the efficiency of completion operations in unconventional reservoirs. This signal has not been publicly reported by others. In this invention, we develop a workflow to efficiently manage and process the DAS data to retrieve this low-frequency signal for further interpretation.

DAS data delivered by acquisition contractors are sampled at very high frequency (10 k Hz), and segmented into small time intervals. The data volume ranges from 100 TB to 1000 TB for a single project. Utilizing parallel computing and data storage infrastructure created for data intensive projects like seismic data processing can easily handle the completed data set once transformed. A simple process has been developed:

DAS data are converted from vendor's format into a continuous record

A low-pass filter transforms the data to 0.05 Hz and down sampled to 1 s intervals This process significantly increase the signal-to-noise ratio of the desired signal while decrease the data size by 10000 fold. The low frequency filtered data also maintains the polarity of the DAS strain-rate measurements (compression or extension), which will have a significant impact for later interpretation (FIG. 2). The polarity change in the low-frequency DAS response is well correlated with stimulation operations (FIG. 3,4).

FIG. 1 shows a standard DAS dataset as provided by the vendor. Although activity can be observed that correlate with different activities performed during operation, the data is noisy and difficult to interpret. FIG. 2 shows low-frequency DAS data after being transformed with a low-pass filer and down sampled to is intervals. The extension and compression can be clearly seen and differentiated in this plot and directly correlated with well events.

The following examples of certain embodiments of the invention are given. Each example is provided by way of explanation of the invention, one of many embodiments of the invention, and the following examples should not be read to limit, or define, the scope of the invention.

Example 1: In-Well Signal During Injection

In example 1, fiber-optic cables are installed outside of the casing and cemented in place along the length of the well during a procedure, in this case during a stage of fracturing. Numerous interrogators are available to record optical signals. In one embodiment, Pinnacle Gen-1 Phase-1 interrogators are used for the recording. The fiber optic cables are interrogated with multiple high-speed laser pulses while monitoring the reflected light signal (Rayleigh scatter) along the fiber. This is repeated in a variety of patterns dependent upon the data being collected. The raw data are sampled at 10 kHz continuously at more than 6000 locations (referred as "channels" in this study) with 1 m spatial separation along the fiber. The gauge length is set to 5 m. When recording, the measured optical phase is differentiated in time, so the raw DAS data is linearly associated with strain rate along the fiber.

FIG. 4 shows a Low-Frequency In-well signal. The data is obtained from a horizontal production well that is being fractured. A single stage from approximately 15,900 feet to 16,150 feet is shown. Pumping is initiated after 0.5 hours (A) and compression may be seen in the previous stage, between 16,300 feet to 16,500 feet, until the ball seats (B). Once the ball is seated, the heel pressure increases and a large amount of compression occurs at the target depth, approximately 15,900 to 16,150 feet. After the initial compression, extension begins to occur and is sustained for approximated 2 hrs until pumping stops (C). The plug depth is labeled vertically (D) to emphasize the current perforation stage.

This application can be used to detect the stage isolation condition in real time to provide advice for the field operators.

Example 2: Cross-Well Signal During Hydraulic Fracturing

In example 2, fiber-optic cables are installed outside of the casing and cemented in place along the length of an adjacent well. Numerous interrogators are available to record optical signals. In one embodiment, Pinnacle Gen-1 Phase-1 interrogators are used for the recording. The fiber optic cables are interrogated with multiple high-speed laser pulses while monitoring the reflected light signal (Rayleigh scatter) along the fiber. This is repeated in a variety of patterns dependent upon the data being collected. The raw data are sampled at 10 kHz continuously at more than 6000 locations (referred as "channels" in this study) with 1 m spatial separation along the fiber. The gauge length is set to 5 m. When recording, the measured optical phase is differentiated in time, so the raw DAS data is linearly associated with strain rate along the fiber.

FIG. 3 shows a Low-Frequency Cross-well signal. This data is obtained from an observation or production well that is located near or adjacent to the target well. A single stage (A-C) can be seen where pumping starts (A), the ball seats (B), and then pumping stops (C). Initially between A and B, there is an extension at about 13,750 feet (previous fracture site) until the ball seats (B). Then compression occurs at the previous fracture site, and extension begins at the new fracture site between 13,500 and 13,750 feet. Extension continues until pumping stops (C). Compression slowly occurs between the stopping of the current stage (C) until starting the next stage (E). During the compression, the movement of the perforation gun (D) can be observed. Once the next stage starts (E) similar extension and compression patterns can be observed. The process is repeated multiple times until the length of the well is fractured.

This application can be used to detect the hydraulic fracture intersections on the monitor wells and estimate the fracture widths.

Example 3: In-Well Signal During Production

The production well with optical fiber installed is shut in for a period of time. During the shut-in period, small differences in formation temperature permeate into the well bore through thermal conduction. When production resumes, the fluid flow within the well causes a measurable wave of temperature fluctuations to move in the direction of the flow. Flow rates along the well can be inferred from these temperature changes, and variations in rates provides an indication of the relative productivity of the well intervals.

Example 4: Cross-Well Signal During Production

Two nearby production wells with optical fiber installed may be separated by 50-1000 ft can both be shut in for a varying periods of time. When one of the wells is brought back to production, the low-frequency DAS signal in the other well shows the low amplitude response at several individual zones along the wellbore, illustrating the fracture connectivity between these two wells.

Example 5: Vertical Monitor Well Response

A vertical well with optical fiber installed may be placed near a horizontal well that is being stimulated. When the vertical dipping hydraulic fractures hit a vertical well with fiber installed, the low-frequency DAS signal can be used to map the time and location of the fracture propagation front. The height (vertical extension) of the fracture can also be estimated from the signal.

Example 6: Quick Assay

Several venders provide solutions including placing a temporary fiber optic cable in a well and take DAS and DTS measurements. In this case the low-frequency signal is only controlled by the small temperature variation of the wellbore. Example 1 and 3 are still applicable under this configuration. Quick installation of a fiber optic cable may be just the fiber optic cable or bundle of cables, but the fiber optic cable may also be installed via coiled tubing or slick-line if required.

Example 7: Heavy Oil Horizontal Wells fiber optic signals including DAS and DTS signals are effective tools for steam chamber monitoring in SAGD production for heavy oil reservoirs. The temperature variation along the borehole has been traditionally monitored through thermocouples. The low frequency DAS has the potential to provide very detailed distributed in-well and cross-well temperature and strain signal during steam injection and oil production. This can be used for steam chamber growth efficiency monitoring between multiple well pairs and monitoring production rates to ensure breakthrough, if it occurs, is halted quickly. The application can be extended to additional thermal EOR process monitoring such as ESAGD, downhole heating, cyclic steam injection and the like.

Example 8: Plug & Abandonment

Low Frequency DAS can also have applications for passive monitoring in a well plug and abandonment scenario where the primary signal will be relating to strain changes during a pressure drawdown phase. This application will require longer time measurements or periodic measurements. In one embodiment measurements are taken daily for a 15 minute period. These results are transmitted to a central location for analysis. Flow may cause a strain or temperature change that can be observed if the integrity of the plugged well is compromised.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 6,778,720, "Dual slope fiber optic array interrogator," (2004).
2. US8950482, "Fracture monitoring," (2009).
3. US20060272809, "Wellbores utilizing fiber optic-based sensors and operating devices," (2006).
4. US20090114386, "Systems and methods for distributed interferometric acoustic monitoring," (2009).
5. US20130298635, "Techniques for Distributed Acoustic Sensing," (2013).

6. US20130298665, "System and method for monitoring strain & pressure," (2013).
7. US20130233537, "Fracture Characterisation," (2013).
8. US20140202240, "Flow Velocity and Acoustic Velocity Measurement with Distributed Acoustic Sensing," (2014).
9. US20140216151, "Flow Monitoring," (2014).
10. US20140260588, "Flow Sensing Fiber Optic Cable and System," (2014).
11. US20140358444, "Method of Hydraulic Fracture Identification Using Temperature," (2014).
12. US20160003032, "Matrix Temperature Production Logging Tool," (2016).
13. Boman, K, "DAS technology expands fiber optic applications for oil, gas industry," Rigzone, May 4, 2015 issue.
14. Webster, P., et al., "Developments in Diagnostic Tools for Hydraulic Fracture Geometry Analysis," Unconventional Resources Technology Conference (URTeC), Denver, Colo., 12-14 Aug. 2013.
15. Optasense, "Pipeline Integrity Management: Leak Detection," www.optasense.com (2013).

The invention claimed is:

1. A method for improving hydrocarbon production, where the method comprises:
    a) installing one or more fiber optic cables along a wellbore in a hydrocarbon formation;
    b) installing one or more interrogators on at least one fiber optic cable;
    c) interrogating at least one fiber optic cable with an interrogation signal;
    d) obtaining one or more distributed acoustic sensing (DAS) datasets from the interrogator;
    e) converting one or more DAS datasets from the interrogator into a continuous record;
    f) transforming the continuous record with a low-pass filter to 1-50 milliHz while down sampling into a transformed well signal;
    g) interpreting the transformed well signal; and
    h) using the interpreted well signal to improve hydrocarbon production from said hydrocarbon formation.

2. The method of claim 1, wherein said transformed well signal is an in-well signal from the wellbore of interest consisting of a production well or an injection well.

3. The method of claim 1, wherein said transformed well signal is a cross-well signal from a wellbore that is adjacent to the well of interest consisting of a production well, and injection well, a monitoring well, or a vertical well.

4. The method of claim 1, wherein the hydrocarbon formation is undergoing hydraulic fracturing, start-up, shut-in, enhanced oil recovery, waterflood, steamflood, or water alternating gas treatment.

5. The method of claim 1, wherein the continuous record is transformed with an ultra-low frequency filter from 0 to 1 mHz.

6. The method of one of claim 1, wherein the continuous record is downsampled to 1 second intervals.

7. A method of monitoring hydrocarbon production comprising, installing one or more fiber optic cables along a wellbore in a hydrocarbon formation; interrogating at least one fiber optic cable with an interrogator; obtaining one or more DAS datasets from the interrogator; converting one or more DAS datasets from the interrogator into a continuous record; transforming the continuous record with a low-pass filter to 1-50 milliHz while down sampling into a transformed well signal; interpreting the transformed well signal; and monitoring hydrocarbon production from said hydrocarbon formation.

8. The method of claim 7, wherein said transformed well signal is an in-well signal from the wellbore of interest consisting of a production well or an injection well.

9. The method of claim 7, wherein said transformed well signal is a cross-well signal from a wellbore that is adjacent to the well of interest consisting of a production well, and injection well, a monitoring well, or a vertical well.

10. The method of claim 7, wherein the hydrocarbon formation is undergoing hydraulic fracturing, start-up, shut-in, enhanced oil recovery, waterflood, steamflood, or water alternating gas treatment.

11. The method of claim 7, wherein the continuous record is transformed with an ultra-low frequency filter from 0 to 1 mHz, 5 mHz, 10 mHz, 15 mHz, 20 mHz, 30 mHz, 45 mHz, or 50 mHz.

12. The method of claim 7, wherein the continuous record is downsampled to 1, 3, 5, 10, 15, 20, 25, 50, 75, or 100 second intervals.

13. A method of improving the effectiveness of a hydrocarbon well completion, comprising:
    a) installing one or more fiber optic cables along a wellbore in a hydrocarbon formation;
    b) installing one or more interrogators on at least one fiber optic cable;
    c) interrogating at least one fiber optic cable with an interrogation signal before, during, and after a well treatment;
    d) obtaining one or more DAS datasets from the interrogator;
    e) converting one or more DAS datasets from the interrogator into a continuous record;
    f) transforming the continuous record with a low-pass filter to 1-50 milliHz while down sampling into a transformed well signal;
    g) interpreting the transformed well signal; and
    h) using the interpreted well signal to improve hydrocarbon well completions in said hydrocarbon formation.

14. The method of claim 13, wherein said transformed well signal is an in-well signal from the wellbore of interest consisting of a production well or an injection well.

15. The method of claim 13, wherein said transformed well signal is a cross-well signal from a wellbore that is adjacent to the well of interest consisting of a production well, and injection well, a monitoring well, or a vertical well.

16. The method of claim 13, wherein the hydrocarbon formation is undergoing hydraulic fracturing.

17. The method of claim 13, wherein the continuous record is transformed with an ultra-low frequency filter from 0 to 1 mHz, 5 mHz, 10 mHz, 15 mHz, 20 mHz, 30 mHz, 45 mHz, or 50 mHz.

18. The method of claim 13, wherein the continuous record is downsampled to 1, 3, 5, 10, 15, 20, 25, 50, 75, or 100 second intervals.

* * * * *

UNITED STATES PATENT AND TRADEMARK OFFICE
CERTIFICATE OF CORRECTION

PATENT NO. : 10,458,228 B2  
APPLICATION NO. : 15/453434  
DATED : October 29, 2019  
INVENTOR(S) : Ge Jin et al.

Page 1 of 1

It is certified that error appears in the above-identified patent and that said Letters Patent is hereby corrected as shown below:

In the Claims

Column 9, Line 54 In Claim 6 should read:  
The method of claim 1, wherein the continuous record is downsampled to 1 second intervals.

Signed and Sealed this  
Eighteenth Day of February, 2020

Andrei Iancu  
*Director of the United States Patent and Trademark Office*